E. G. KOLLASCH.
VEHICLE WHEEL.
APPLICATION FILED JULY 19, 1919.

1,395,189.

Patented Oct. 25, 1921.
2 SHEETS—SHEET 1.

WITNESSES

INVENTOR.
BY E. G. Kollasch,
ATTORNEY.

E. G. KOLLASCH.
VEHICLE WHEEL.
APPLICATION FILED JULY 19, 1919.
1,395,189.
Patented Oct. 25, 1921.
2 SHEETS—SHEET 2.
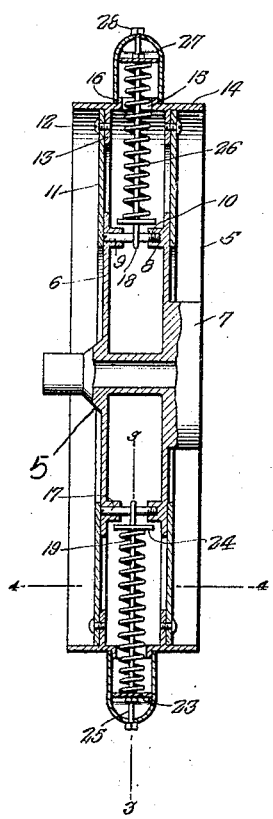
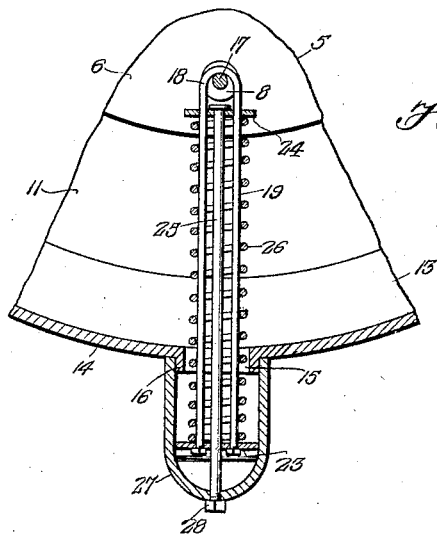
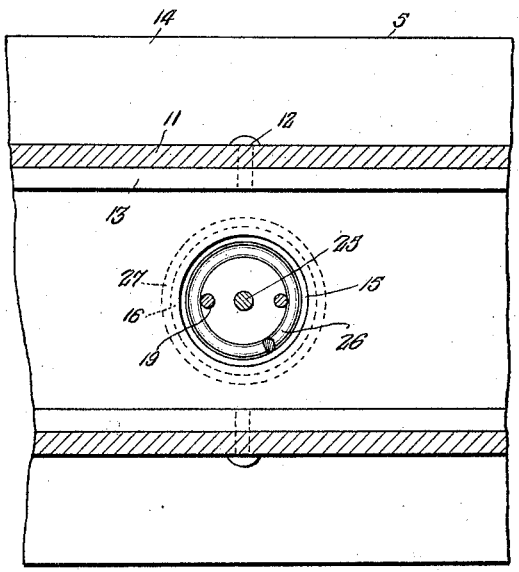
WITNESSES
INVENTOR.
E. G. Kollasch,
BY
Victor J. Evans
ATTORNEY.

UNITED STATES PATENT OFFICE.

EDWARD GEORGE KOLLASCH, OF BROWNING, MISSOURI.

VEHICLE-WHEEL.

1,395,189. Specification of Letters Patent. Patented Oct. 25, 1921.

Application filed July 19, 1919. Serial No. 312,092.

*To all whom it may concern:*

Be it known that I, EDWARD G. KOLLASCH, a citizen of the United States, residing at Browning, in the county of Linn and State of Missouri, have invented new and useful Improvements in Vehicle-Wheels, of which the following is a specification.

This invention relates to resilient wheels for vehicles and may be considered in the nature of an improvement upon my co-pending U. S. application Serial No. 195,130.

The improvement relates especially to the spring hub for wheels designed to absorb shocks incidental to such wheels when passing over rough roads and has for its primary object to produce a novel construction of such hubs for permitting the use of solid or inelastic tires on the wheels.

A further object of the invention is to reduce the number of parts employed in my referred to co-pending application and in other ways simplify and improve the construction without impairing the efficiency thereof.

The foregoing objects and others may be accomplished by a construction and arrangement of parts such as illustrated by the accompanying drawings, in which:

Fig. 2 is an enlarged sectional view through the hub.

Fig. 3 is a sectional view approximately on the line 3—3 of Fig. 2.

Fig. 4 is a sectional view approximately on the line 4—4 of Fig. 2.

Figure 1:
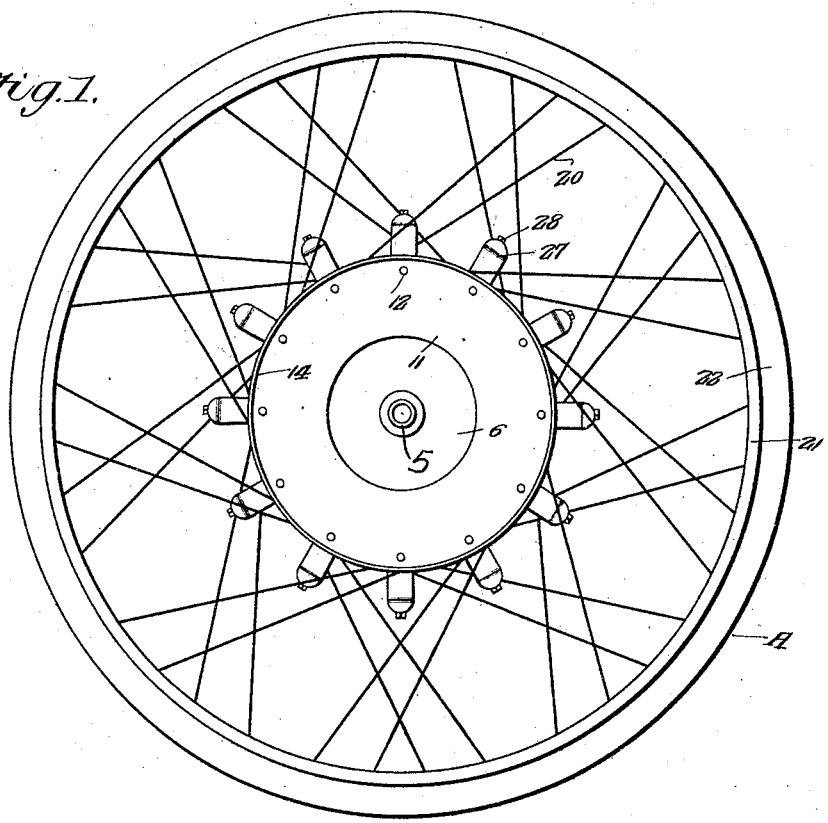
Figure 1 is a view in side elevation of a vehicle wheel constructed in accordance with the invention showing a part of the hub broken away.
Figure 5:
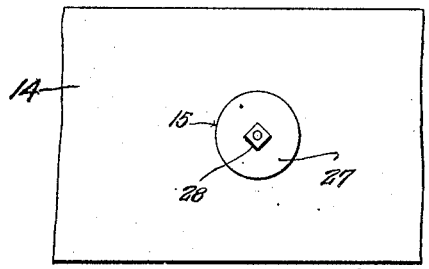
Fig. 5 is a detail plan view of the band.

Referring now to the drawings in detail, in which like reference characters designate corresponding parts throughout, a vehicle wheel is indicated by the numeral A, the same including a hub 5 for the axle spindle, a rim 21 connected with tangentially arranged spokes 20 and a tire 22 on said rim.

The hub 5 has its ends provided with flanges 6 which are in the nature of flat round plates. The flanges may be formed integrally with the hub, as is preferable, or may be removably secured thereto, and on one of the flanges 6 is secured or is formed a ring member 7 that provides a bearing surface for a brake band (not shown).

The side members or flanges 6 of the hub, near the outer edge thereof are formed with oppositely disposed inturned teats 8, the series of teats on one of the flanges being provided with openings 9 which also extend through the said flange, while the teats on the other flange being provided with threaded orifices 10 that do not extend through the said flange.

Designed to be arranged on the opposite and outer faces of the sides or flanges 6 of the hub are flat ring members 11. These rings 11 have their outer edges secured by removable elements 12 to an inturned circumferential flange or rib 13 integrally formed on the inner periphery of a band 14. The band 14 is provided with a plurality of equally spaced round openings 15, and each of these openings is surrounded by an outstanding circular flange 16. The openings 16 are disposed radially with respect to the pairs of teats 8 on the side members or flanges 6 of the hub 5.

The numerals 17 designate headless bolt members that pass through the opening 9 in one of the flanges and in the teats 8 connected with the flange and have their threaded portions coöperate with the threads in the teats of the opposite flange. The outer ends of the bolts 17 are kerfed and are arranged flush with or inward of the outer face of one of the sides or flanges 6 of the hub. By this arrangement the ring members 11 may freely move over the sides of the hub and will not be interfered with by the bolts.

Each of the bolts 17 receives thereon the inner curved end 18 of a substantially U-shaped member 19. The legs of each of the members 19 pass through suitable openings and are secured to the outer face of a plate 23. On the legs of each of the members 19 is arranged for slidable movement a second plate 24. Each of the plates 24 has centrally connected therewith a bolt member 25 that passes through a central opening in the plate 23. Between the plates 23 and 24, and exerting a pressure between the said plates is a helical spring 26. The threaded end of each of the bolts 25 passes through the outer closed end of a cup-shaped casing 27 and the said outer end of each of the said bolts is engaged by a nut 28. The annular rings or flanges 16 engage with the inner surfaces of the respective inverted cup-shaped members 27, and the tension of the springs 26, in addition to the frictional engagement between the said flanges 16 and the said cups retain the cups on the band 14.

With a construction as above described, it will be seen that the tire of the wheel is cushioned with respect to the hub and that the spring connection between the hub and the band 14 permits free vibration in all directions radial to the hub, so that a cushioning effect is afforded the tire 22 almost if not as great as would be imparted thereto were the wheel pneumatically tired. It will be also noted that the parts may be readily assembled, and that any desired equal number of springs between the hub proper and the outer band 14 thereof may be employed. Also the tension on the springs may be readily regulated, and that the co-engagement of the parts renders the interior thereof dust and moisture-proof.

Having thus described the invention, what is claimed as new, is:—

In a wheel of the class described, the combination with a rim and a tire mounted on said rim, of a metallic band having a plurality of openings therein, inturned circumferential flanges formed integrally with said band adjacent to said openings, flat ring members secured to opposite sides of said inturned flanges, a hub disposed within said band, an annular flange formed integrally with one side of said hub, engaging one of said ring members and provided with inwardly directed teats having openings therethrough, an annular flange formed integrally with the opposite side of said hub, engaging the opposing ring member and provided with inwardly directed teats having threaded orifices therein, headless bolts passing through the openings in the first mentioned teats and engaging the threads of the orifices, a plurality of outstanding circular flanges formed integrally with said band around the openings therein, cup-shaped casings engaging said flanges and inclosing said openings, a plate disposed in each of said casings and having openings therein, U-shaped members carried by said headless bolts, extending through the openings in said band and secured to said plates, bolts disposed between the arms of the U-shaped members, passing through said plates and secured to said casings, a plate secured to one end of each bolt, a helical spring surrounding each U-shaped member and exerting a pressure between said plates and tangentially arranged spokes secured to said band and connected to said rim aforesaid.

In testimony whereof I affix my signature.

EDWARD GEORGE KOLLASCH.